(12) United States Patent
Nyborg

(10) Patent No.: US 8,487,462 B2
(45) Date of Patent: Jul. 16, 2013

(54) METHODS FOR CONTROLLING A WIND TURBINE CONNECTED TO THE UTILITY GRID, WIND TURBINE AND WIND PARK

(75) Inventor: Anders Nyborg, Arhus C (DK)

(73) Assignee: Vestas Wind Systems A/S, Aahrus N (DK)

( * ) Notice: Subject to any disclaimer, the term of this patent is extended or adjusted under 35 U.S.C. 154(b) by 30 days.

(21) Appl. No.: 12/911,797

(22) Filed: Oct. 26, 2010

(65) Prior Publication Data

US 2011/0040414 A1 Feb. 17, 2011

Related U.S. Application Data

(63) Continuation of application No. 12/404,974, filed on Mar. 16, 2009, now Pat. No. 7,911,072, which is a continuation of application No. PCT/DK2007/000404, filed on Sep. 12, 2007.

(51) Int. Cl.
*F03D 9/00* (2006.01)
*H02P 9/04* (2006.01)

(52) U.S. Cl.
USPC .......................................................... 290/44

(58) Field of Classification Search
USPC .................................................. 290/43, 44
See application file for complete search history.

(56) References Cited

U.S. PATENT DOCUMENTS

| | | | | |
|---|---|---|---|---|
| 6,072,302 A * | 6/2000 | Underwood et al. | ........... | 322/17 |
| 6,137,187 A * | 10/2000 | Mikhail et al. | .................. | 290/44 |
| 6,420,795 B1 * | 7/2002 | Mikhail et al. | .................. | 290/44 |
| 6,847,128 B2 * | 1/2005 | Mikhail et al. | .................. | 290/44 |
| 6,856,039 B2 * | 2/2005 | Mikhail et al. | .................. | 290/44 |
| 6,946,751 B2 * | 9/2005 | Yoshida et al. | .................. | 290/44 |
| 7,042,110 B2 * | 5/2006 | Mikhail et al. | .................. | 290/44 |
| 7,095,131 B2 * | 8/2006 | Mikhail et al. | .................. | 290/44 |
| 7,400,055 B2 * | 7/2008 | Nagao | ............................. | 290/44 |
| 7,423,352 B2 * | 9/2008 | Suryanarayanan et al. | .... | 290/55 |
| 7,569,944 B2 * | 8/2009 | Oohara et al. | .................. | 290/44 |
| 7,851,934 B2 * | 12/2010 | Nyborg | ........................... | 290/44 |
| 7,911,072 B2 * | 3/2011 | Nyborg | ........................... | 290/44 |
| 7,919,880 B2 * | 4/2011 | Nielsen et al. | .................. | 290/44 |
| 8,057,158 B2 * | 11/2011 | Seidel et al. | ...................... | 415/1 |
| 8,116,914 B2 * | 2/2012 | Oohara et al. | ................. | 700/287 |
| 8,167,556 B2 * | 5/2012 | Bjerge et al. | .................... | 416/35 |
| 8,174,137 B2 * | 5/2012 | Skaare | ............................ | 290/44 |
| 8,183,704 B2 * | 5/2012 | Rivas et al. | ..................... | 290/44 |
| 8,264,209 B2 * | 9/2012 | Kretschmann | ................. | 322/25 |
| 2002/0105189 A1 * | 8/2002 | Mikhail et al. | .................. | 290/44 |
| 2004/0094964 A1 * | 5/2004 | Mikhail et al. | .................. | 290/44 |
| 2004/0145188 A1 * | 7/2004 | Janssen et al. | .................. | 290/44 |
| 2004/0207208 A1 * | 10/2004 | Mikhail et al. | .................. | 290/44 |
| 2008/0030027 A1 * | 2/2008 | Erdman et al. | ............. | 290/40 R |
| 2008/0069692 A1 * | 3/2008 | Oohara et al. | .................. | 416/31 |
| 2008/0118342 A1 * | 5/2008 | Seidel et al. | ...................... | 415/1 |
| 2008/0277938 A1 * | 11/2008 | Oohara et al. | .................. | 290/44 |
| 2008/0296898 A1 * | 12/2008 | Ichinose et al. | ................. | 290/44 |
| 2009/0174186 A1 * | 7/2009 | Nyborg | ........................... | 290/44 |
| 2009/0174187 A1 * | 7/2009 | Nyborg | ........................... | 290/44 |
| 2009/0200804 A1 * | 8/2009 | Nielsen et al. | .................. | 290/44 |
| 2009/0292397 A1 * | 11/2009 | Bjerge et al. | .................. | 700/280 |
| 2010/0045038 A1 * | 2/2010 | Skaare | ............................ | 290/44 |
| 2011/0025059 A1 * | 2/2011 | Helle et al. | ..................... | 290/44 |
| 2012/0043758 A1 * | 2/2012 | Esbensen et al. | ................ | 290/44 |
| 2012/0150524 A1 * | 6/2012 | Nielsen et al. | ................ | 703/18 |

* cited by examiner

*Primary Examiner* — Pedro J Cuevas
(74) *Attorney, Agent, or Firm* — Patterson & Sheridan, LLP

(57) ABSTRACT

Methods for controlling a wind turbine connected to the utility grid by detecting status of the utility grid, and controlling one or more rotor blades and/or emitted power to the grid in returning to the operational wind turbine settings of normal grid mode, as well as wind turbines and wind parks comprising at least two wind turbines.

16 Claims, 6 Drawing Sheets

METHODS FOR CONTROLLING A WIND TURBINE CONNECTED TO THE UTILITY GRID, WIND TURBINE AND WIND PARK

CROSS-REFERENCE TO RELATED APPLICATIONS

The present application is a continuation of application Ser. No. 12/404,974, filed Mar. 16, 2009, which is a continuation of pending International Application No. PCT/DK2007/000404 filed Sep. 12, 2007, which designates the United States and claims priority from Danish patent application PA 2006 01186 filed on Sep. 14, 2006, the content of each of which is incorporated herein by reference herein in its entirety.

FIELD OF THE INVENTION

The invention relates to methods for controlling a wind turbine connected to the utility grid, a wind turbine and a wind park.

BACKGROUND OF THE INVENTION

National utility grid companies sets out the strategies and requirements for the connection of power generation equipment to the utility grid. These connection requirements are detailed described in Grid Codes and varies from nation to nation.

One of the topics discussed in the grid codes is the capabilities of a wind turbine when the utility grid experiences a fault. It is essential for the operation of a wind turbine and for a reliable supply of power that a wind turbine can stay connected and synchronized to the utility grid during said grid fault.

System faults are typically short circuits and can be any combination of a three phases and earth short circuits. When a short circuit occur the flow of current results in voltage drops (low voltage situation) throughout the utility grid and the magnitude is dependent of the magnitude of the fault current, the impedance of the short circuit path and the type of short circuit. Further, a low voltage situation may comprise more than one voltage drop e.g., two successive voltage drops.

When a wind turbine experience a utility grid fault the generator speed increases almost immediately as a result of the excessive aerodynamical power that can not be converted to electrical power. Therefore the aerodynamical power must be reduced drastically throughout the period of utility grid fault.

One method of prior art is to turn the blades of the wind turbine from an operating position to a park position and allow the wind turbine generator to trip offline when the utility grid fault occurs. But as the grid codes typically sets up requirements for a low voltage ride through (LVRT) that requires the wind turbine generator to stay connected, said method of prior art is not compatible with the grid codes.

U.S. Pat. No. 6,921,985 discloses a LVRT system for a wind turbine connected to a utility grid. The blade pitch angle is varied when a low voltage is detected in order to maintain the rotor speed below an over speed trip limit.

It is an object of the present invention to provide advantageous methods of operating a wind turbine in returning to the operational wind turbine settings of normal grid mode.

SUMMARY OF THE INVENTION

The invention provides a method for controlling a wind turbine connected to the utility grid comprising steps of:

detecting status of the utility grid, detecting mechanical oscillations and/or loads of the wind turbine, and controlling one or more rotor blades and/or emitted power to the grid in dependency of said mechanical oscillations and/or loads in returning to the operational wind turbine settings of normal grid mode.

Hereby it is ensured that when the rotor blade or blades are pitched back to operational pitch angle settings of normal grid mode they can be controlled in such a way that the hereby caused oscillations and/or loads will not significantly add to already existing oscillations and/or loads of the wind turbine.

In another aspect of the invention said detecting status of the utility grid comprises detecting at least one value indicating the status of the utility grid e.g., a normal grid mode or fault grid mode. Hereby it is ensured that the wind turbine can return to operational wind turbine settings as soon as possible after the recovery of a grid fault such as a low voltage grid fault In another aspect of the invention said returning to the operational wind turbine settings comprises returning to normal grid mode from a fault of the utility grid.

In another aspect of the invention returning to the operating settings of normal grid mode comprises reapplying of thrust in counter phase to said mechanical oscillations and/or loads of the wind turbine e.g., the tower oscillation, rotor blade oscillation, foundation oscillation or combinations hereof.

Hereby it is ensured that oscillations and/or loads produced in the wind turbine by returning to operating settings of normal grid mode does not give cause to constructive interference of said oscillations and/or loads. Constructive interference can cause excessive loads on said wind turbine that will exceed load limits and result in damage to the wind turbine.

Furthermore it is ensured that oscillations and/or loads produced in the wind turbine by returning to operating settings of normal grid mode can cause destructive interference of said oscillations and/or loads, whereby said oscillations is damped.

In another aspect of the invention said mechanical oscillations and/or loads is detected by means located in the wind turbine e.g. in the tower, nacelle, rotor blades and/or foundation. Hereby it is ensured that means to detect oscillations and/or loads are located in wind turbine components that is under influence of said oscillations and/or loads whereby a more accurate detection can be obtained.

In another aspect of the invention said detecting status of the utility grid comprises detection of the grid voltage and/or the voltage/sec slope of an alternating utility grid voltage. Hereby it is ensured that vital parameters are detected in order to give a valid detection of said status.

The invention also provides a method for controlling a wind turbine connected to the utility grid comprising steps of:

detecting status of the utility grid, and controlling one or more rotor blades and/or emitted power to the grid in dependency of a fixed control value such as constant pitch rate and/or predefined time period in returning to the operating settings of normal grid mode.

Hereby it is ensured that when the rotor blade or blades are pitched back to operational pitch angle settings of normal grid mode, the hereby caused oscillations and/or loads will not significantly add to already existing oscillations and/or of the wind turbine.

In another aspect of the invention said fixed control value is substantial different from its extremes. By the term "extremes" is meant the highest and/or lowest possible value of said control value. Hereby it is ensured that returning to the operating settings of normal grid mode is done by using control values that does not result in significant additional loads on the wind turbine.

In another aspect of the invention returning to the operating settings of normal grid mode comprises reapplying of thrust with a constant pitch rate such as less than 10 degree/sec. preferably 8 degree/sec. and/or over a predefined time period such as more than 0.5 seconds preferably 4 seconds.

In another aspect of the invention returning to the operating settings of normal grid mode comprises reapplying of thrust in dependency of the wind turbine tower eigenfrequency. Hereby it is ensured that reapplying of thrust can be optimized to different types of tower whereby loads on said tower can be minimized.

In another aspect of the invention said detecting status of the utility grid comprises detection of the grid voltage and/or the voltage/sec slope of an alternating utility grid voltage. Hereby it is ensured that vital parameters are detected in order to give a valid detection of said status.

The invention also relates to a wind turbine connected to a utility grid comprising:

at least one blade pitch system to control the pitch of one or more rotor blades, and at least one wind turbine control system including a system performing a method according to one or more of the preceding claims in returning to the operating settings of normal grid mode.

Hereby it is ensured that the wind turbine is controlled with control values that are adapted to the specific operating situation when returning from a grid fault mode to a normal grid mode.

Even further the invention relates to a wind turbine further comprising at least one detector for detecting failures in the utility grid e.g. at least one voltage detector. Hereby an advantageous control of the wind turbine is ensured.

The invention also relates to a wind park comprising at least two wind turbines according to the wind turbine claim and at least one detector for detecting failures in the utility grid.

BRIEF DESCRIPTION OF THE DRAWINGS

The invention will be described in the following with reference to the figures in which.

DETAILED DESCRIPTION OF THE INVENTION

Figure 1:
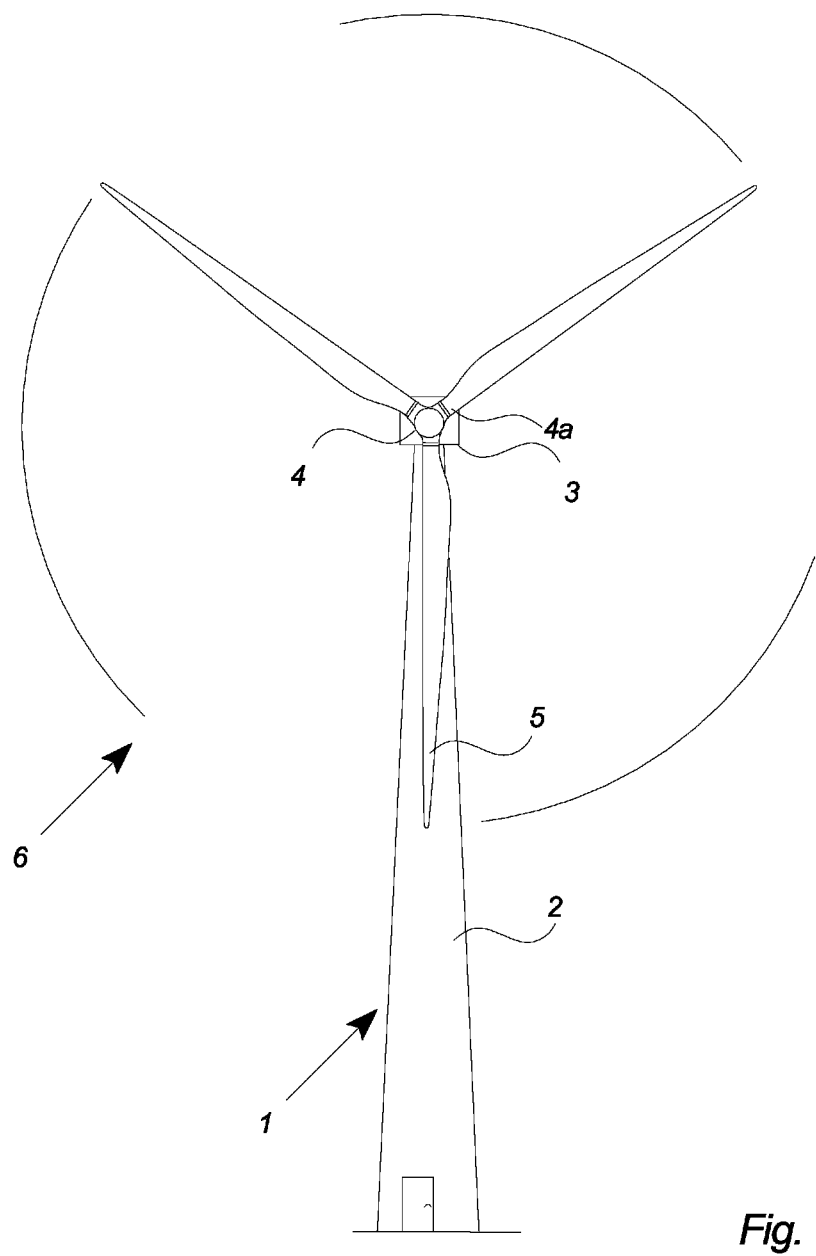
FIG. 1 illustrates a large modern wind turbine including three wind turbine blades in the wind turbine rotor.

FIG. 1 illustrates a modern wind turbine 1 with a tower 2 and a wind turbine nacelle 3 positioned on top of the tower.

The wind turbine rotor, comprising at least one blade such as three wind turbine blades 5 as illustrated, is connected to the hub 4 through pitch mechanisms 4a. Each pitch mechanism includes a blade bearing and pitch actuating means which allows the blade to pitch. The pitch process is controlled by a pitch controller.

As illustrated in the figure, wind over a certain level will activate the rotor and allow it to rotate in a perpendicular direction to the wind. The rotation movement is converted to electric power which usually is supplied to the utility grid as will be known by skilled persons within the area.

Figure 2:
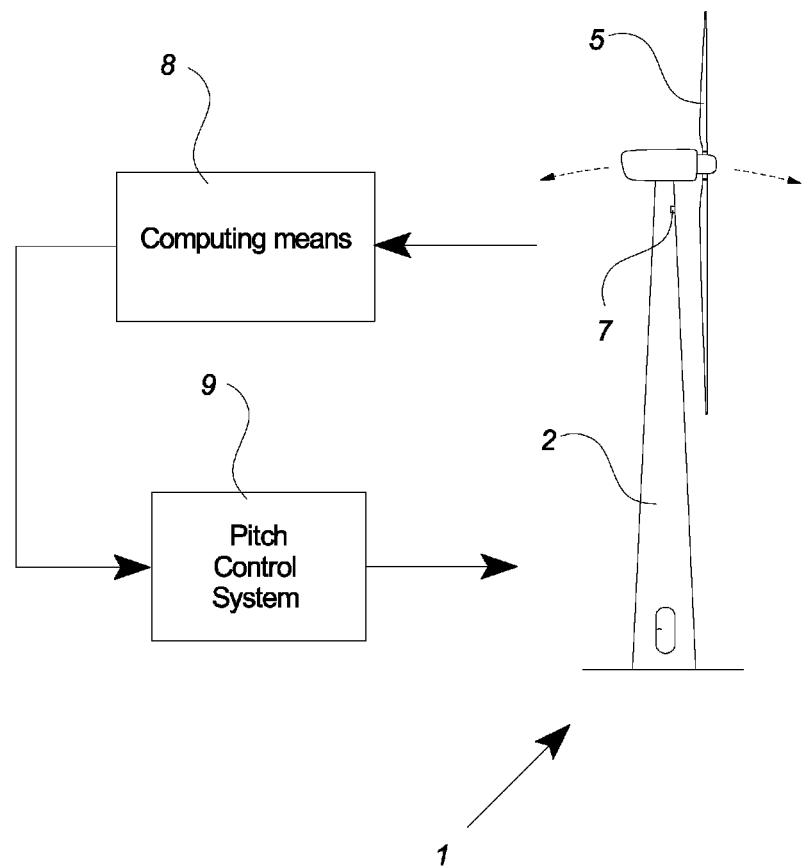
FIG. 2 illustrates schematically a preferred embodiment of a wind turbine with a control system for controlling the pitch angles of the wind turbine blades.

FIG. 2 illustrates schematically one preferred embodiment of a control system for controlling the pitch angles of the wind turbine blades 5.

Data of the wind turbine 1 are measured with sensor means 7 such as pitch position sensors, blade load sensors, rotor azimuth sensors, tower acceleration sensors etc. The measured sensor data are supplied to computing means 8 in order to convert the data to feedback signals. The feedback signals are used in various control systems e.g. the pitch control system 9 for controlling the pitch angle by establishing control values for controlling said at least one wind turbine blade 5.

The computing means 8 preferably includes a microprocessor and computer storage means for continuous control of the said feedback signal.

As indicated by the dashed arrows at the nacelle 3 the wind turbine tower 2 can oscillate resulting in a displacement of said nacelle 3. As will be known by skilled persons within the area said tower can oscillate at its eigenfrequency e.g. as a result of a sudden change in thrust applied to the rotor. Said oscillation can result in excessive loads on said tower and in worst case cause damage.

Figure 3:
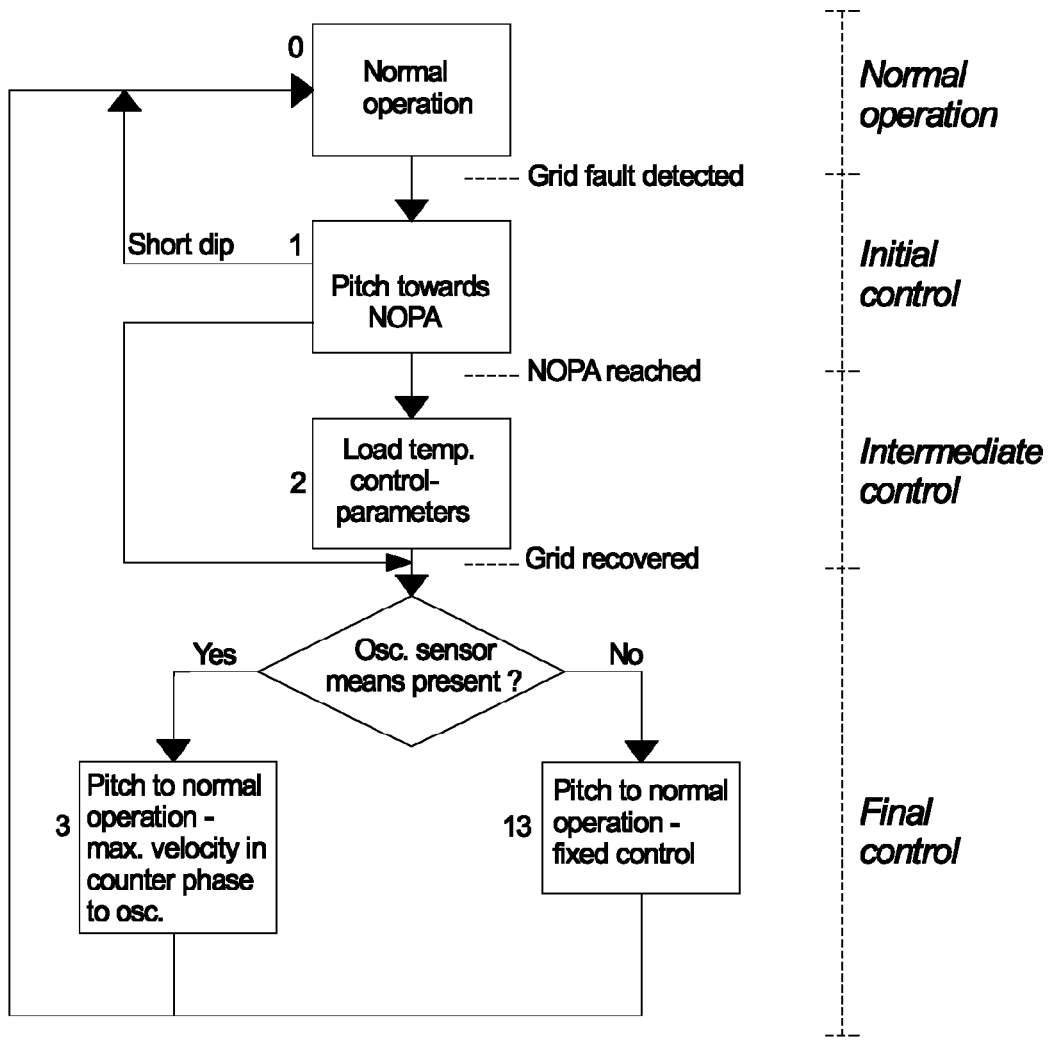
FIG. 3 illustrates the conceptual state-sequence for the present invention.

FIG. 3 illustrates for one preferred embodiment of the invention schematically a conceptual state-sequence diagram for the invented control algorithm comprising steps of:

Normal operation (state 0)

detecting a utility grid fault event, an initial control of a wind turbine 1 in order to stabilize the wind turbine rotor speed with new control parameters as a response to said utility grid fault event (state 1), an intermediate control of the wind turbine at a stabilized level during the fault event (state 2), detecting a recovery of the grid, and a final control of the wind turbine while returning to normal operating conditions (state 3 or state 13). As indicated on the figure state 3 is entered if means for measuring values of the mechanical oscillations and/or loads are present (a preferred embodiment). State 13 is entered if said means are not present.

For one embodiment of the invention comprising a wind turbine 1 comprising sensor means for measuring values representing mechanical oscillations and/or loads of the wind turbine, a description of each state and the state switch conditions between said states is:

| | State | Action in state | Switch condition (to go to next state) |
|---|---|---|---|
| | 0 | Normal operation | If utility grid fault detected then switch to state 1. |
| Initial control | 1 | Estimation of no acceleration pitch angle (NOPA). Pitch towards NOPA with predefined control parameters e.g. pitch velocity. | If "short dip" then switch to state 0. If grid recovery has been detected before NOPA has been reached then switch to state 2. If estimated NOPA has |

-continued

| State | | Action in state | Switch condition (to go to next state) |
|---|---|---|---|
| | | | been reached then switch to state 2. |
| Intermediate control | 2 | If NOPA reached: Wind turbine controller is loaded with new temporary parameter settings at an rotor over speed. If NOPA not reached: Wind turbine controller is loaded with pre-defined control parameters. | If grid recovery is detected AND wind control turbine oscillations and/or loads indicate that pitching in will occur in counter phase with said oscillations and/or loads then switch to state 3. |
| Final control | 3 | Pitch back to pitch angle value obtained before detected grid fault with predefined control parameters e.g. with maximal pitch rate. | If actual pitch angle value = pitch angle value obtained before detected grid fault then switch to state 0. |

For another embodiment of the invention comprising wind turbine 1 without sensor means for measuring values representing the wind turbine mechanical oscillations and/or loads, a description of each state and the state switch conditions between said states is:

| | State | Description | Switch condition (to go to next state) |
|---|---|---|---|
| | 0 | Normal operation | If utility grid fault detected then switch to state 1. |
| Initial control | 1 | Estimation of no acceleration pitch angle (NOPA). Pitch towards NOPA with predefined control parameters e.g. pitch velocity. | If "short dip" then switch to state 0. If grid recovery has been detected before NOPA has been reached then switch to state 2. If estimated NOPA has been reached then switch to state 2. |
| Intermediate control | 2 | If NOPA reached: Wind turbine controller is loaded with new temporary parameter settings at a rotor over speed. If NOPA not reached: Wind turbine controller is loaded with pre-defined control parameters. | If grid recovery is detected then switch to state 13. |
| Final control | 13 | Pitch back to pitch angle value obtained before detected grid fault with predefined control parameters e.g. fixed pitch rate. | If actual pitch angle value = pitch angle value obtained before detected grid fault then switch to state 0. |

Common for both embodiments are states 0, 1 and 2:

State 0:

The mode of normal operation.

If the generated power by the wind turbine is below a predefined limit such as 25% of nominal power, said fault mode will not be initiated upon detecting a grid fault, as the normal control algorithm will be able to avoid over speeding of the rotor during said grid fault event and will continue operating in normal mode since there is no imminent danger due to the low power in the wind.

State 1 (initial control):

When a grid fault has been detected said state 1 is entered. The basis of this state of the invented control algorithm is to pitch one or more wind turbine rotor blades 5 out of the wind immediately after a fault on the utility grid is detected in order to avoid over speeding of the rotor due to excessive aerodynamically power acting on said rotor.

For one embodiment of the invention the wind turbine rotor blades 5 are pitched to a no acceleration pitch angle (NOPA) which is defined to be the pitch angle that gives equilibrium between aerodynamically power and any wind turbine losses and electrical generated power, hence giving no or substantially no acceleration of the generator. For one embodiment NOPA is calculated immediately after the grid fault is detected by table lookup in a Cp-table. For another embodiment NOPA is established by calculation e.g. with a mathematical algorithm.

For one embodiment of the invention if the grid fault is sufficiently short (a short dip) to have only a low impact on the turbine load, a short dip situation is detected and it is preferred to obtain normal operation and active power production as before said short dip as soon as possible. Consequently for this embodiment the invented algorithm is able to determine the level of significant loads on the turbine and on that basis determine if the grid fault control sequence can be quitted or it needs to be completed.

For another embodiment of the invention where the grid fault lasts too long to be detected as a said short dip but a grid recovery occurs before NOPA is reached, it is preferred to obtain normal operation and active power production as before the grid fault as soon as possible. For this situation a direct jump to normal operation mode would have a too high impact on the wind turbine. Consequently for this embodiment the invented algorithm jumps directly to state 2 where predefined control parameters are re-obtained as explained below.

A good indicator of how much the turbine has been affected, is how much said aero dynamical thrust has been reduced. Pitch angle, tower acceleration, tower load, time or combinations hereof can be fair assumptions herefore. For the example of pitch angle as said indicator, to determine when to use said short dip control strategy or to continue the grid fault control strategy to the next state, said algorithm continuously supervises how far the actual pitch angle is from the recent pitch angle before the grid fault. Consequently if a grid recovery is detected and the difference between the actual pitch angle and a recent pitch angle immediately before said grid fault exceed a certain predefined level, said control algorithm will continue the grid fault control algorithm. Otherwise the grid fault control algorithm will be terminated as fast as possible by returning to state 0 i.e. setting the references for e.g. pitch angle, power and generator rpm to the settings immediately before detecting said grid fault.

State 2 (intermediate control):

The basis of this state of the invented control algorithm is to keep the wind turbine operating within a defined range controllable by the wind turbine controller and connected to the utility grid until the grid has recovered.

For one embodiment when NOPA is reached, wind turbine control is initialized with the present control settings as reference e.g. generator rpm and pitch angle, in order to keep the generator rpm constant or nearly constant at a level above the nominal speed.

For one embodiment where pitching out has been stopped due to detected grid recovery before reaching said NOPA, said state 2 is initiated and predefined control parameters are re-obtained.

The control sequence stays in this state with the present control settings at least until recovery of the utility grid has been detected.

For one preferred embodiment, when means for measuring values representing the wind turbine mechanical oscillations and/or loads are present, a switch to the next state (state 3) can be initiated when pitching in the rotor blades will occur in counter phase to the mechanical oscillations and/or loads of the wind turbine e.g. oscillations resulting from a tower acceleration. I.e. pitching said rotor blades will be done in such a way that the oscillations and/or loads that will be generated by pitching said rotor blades back to normal operation is controlled and generated in counter phase to the existing oscillations and/or loads causing a dampening of the summarized oscillations and/or loads.

For another preferred embodiment, when means for measuring values representing the wind turbine mechanical oscillations and/or loads are not present, said switching to the next state (state 13) can be initiated as soon as recovery of the utility grid has been detected.

State 3: (final control—if sensor means for measuring mechanical wind turbine oscillations and/or loads are present).

In order to return to normal production, reapplying of thrust is necessary by pitching the rotor blades back to their operation position.

As an example of this preferred embodiment, the alternating aerodynamic torque under which the tower has been influenced caused by the sudden drop in thrust when pitching out to NOPA (state 1), the tower will oscillate with its eigenfrequency when the grid fault has recovered resulting in excessive physical loads on the wind turbine components, especially the tower construction.

For this example a switch to state 3 has be initiated when the tower acceleration signal is within a predefined window regarding amplitude and direction.

The pitch angle is ramped back in towards normal production pitch angle with a maximum pitch velocity. Said pitch angle can e.g. be the value as before the detected grid fault event or if conditions has changed during the grid fault event, a new desired pitch angle. Hereby it is achieved that a maximal dampening of said tower oscillation is obtained as well as the rotor speed is decreased towards the rotor speed before the grid fault event.

State 13: (final control—if sensor means for measuring wind turbine oscillations and/or loads are not present).

In order to return to normal production reapplying of thrust is necessary by pitching the rotor blades back to their operation position i.e. the pitch value obtained before detecting a grid fault with predefined control parameters e.g. fixed pitch rate.

As an example of this preferred embodiment the slope of the pitch rate can be calculated as:

$$\text{Pitchrate} = (\theta_{actual} - \theta_{predip})/\text{Trampback}$$

where $\theta_{actual}$=is the actual pitch angle $\theta_{predip}$=is the pitch angle before the grid fault event or, if conditions has changed during the fault event, a new desired pitch angle.

Trampback=a predefined ramp back time

In one embodiment the Trampback must be defined to be longer than one period of the wind turbine tower eigenfrequency in order not to cause positive interference in the tower oscillation when ramping back i.e. for a wind turbine tower with an eigenfrequency of e.g. 0.5 Hz the Trampback must be defined to be longer than 2 seconds such as up to 4 seconds.

In another embodiment for another type of tower with an eigenfrequency of e.g. 1 Hz the Trampback must be defined to be longer than 1 second such as 1.5 seconds.

For an embodiment of a wind turbine tower wherein the tower is very rigid e.g. a short tower the Trampback may be chosen to a shorter period of time than a taller and more flexible tower such as the above mentioned embodiments.

Figure 4:
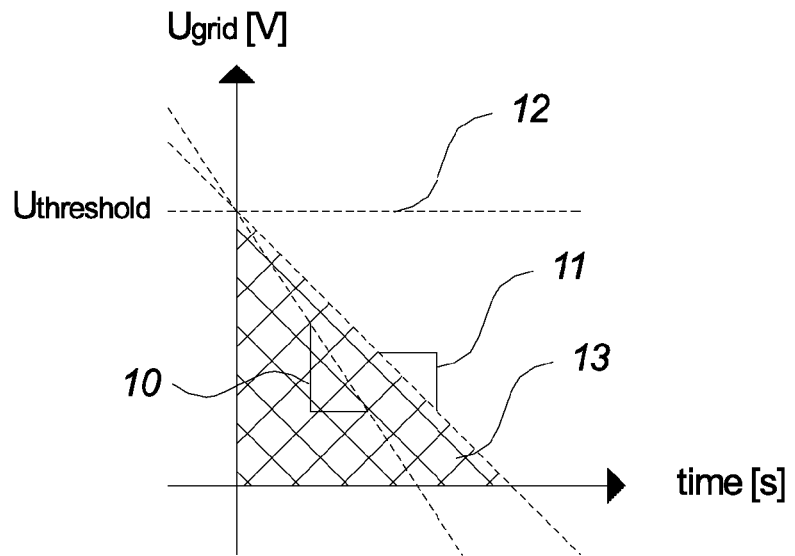
FIG. 4 illustrates two of at least three conditions that must be met in order to detect a utility grid fault event.

FIG. 4 illustrates for one embodiment of the invention conditions that are to be met for the detection of said grid fault event and thereby initiation of a safety mode where the wind turbine is controlled by the invented grid fault control algorithm.

Firstly (not illustrated) the recent generated power must be higher than a predefined limit. If the generated power is less, the normal control algorithm will be able to avoid over speeding or the rotor during a grid fault event and the wind turbine will continue operating in normal mode since there is no imminent danger for e.g. over speeding of the rotor due to the low power in the wind.

Secondly the slope of the grid voltage drop 10 must be higher than a predefined slope limit 11. The slope limit is defined by the operating range of the normal wind turbine controller and its ability to adapt to alternating grid voltages in order to keep control and avoid over speeding of the rotor.

Thirdly the voltage drop must be of a certain predefined size i.e. the grid voltage must drop to below a threshold value $U_{threshold}$ 12.

If said three conditions are met the grid voltage is within the crossed area 15 meaning that a utility grid fault is detected and said grid fault control algorithm is initiated.

Figure 5:
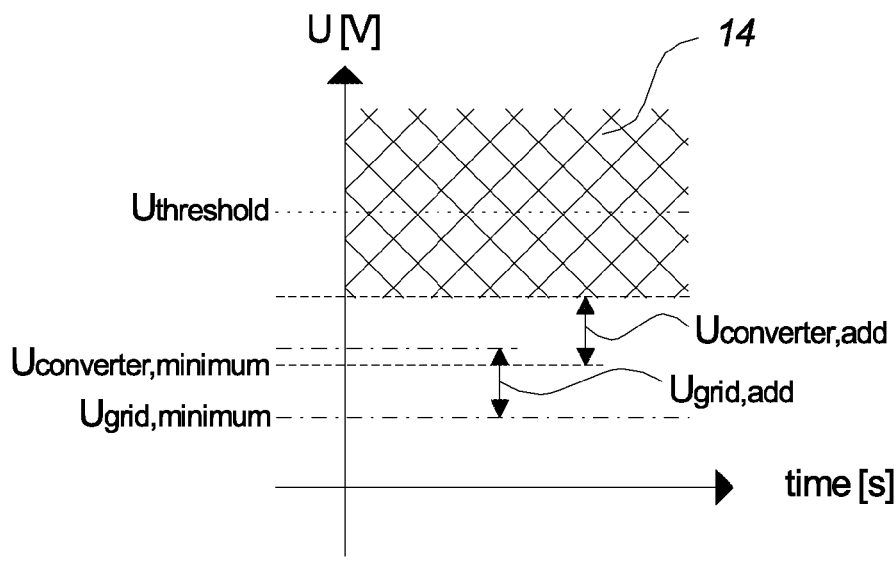
FIG. 5 illustrates the conditions that must be met in order to detect that the utility grid has recovered.

FIG. 5 illustrates for one embodiment of the invention conditions that are to be met for the detection of a grid recovery and thereby allowing the control algorithm to proceed towards normal operation.

Firstly if the grid voltage rises above a predefined low voltage limit for normal operation $U_{threshold}$ 12 the turbine may obtain normal operation.

Otherwise the turbine may obtain normal operation if the grid voltage rises a predefined amount $U_{grid,add}$ above the present low voltage level $U_{grid,minimum}$ during the grid fault AND the voltage is a certain predefined amount $U_{converter,add}$ above the limit $U_{converter,minimum}$ where the wind turbine converter is able to produce active power.

If said conditions are met the grid voltage is within the crossed area 14 meaning that the grid has recovered and said grid fault control algorithm is allowed to proceed towards normal production.

Figure 6:
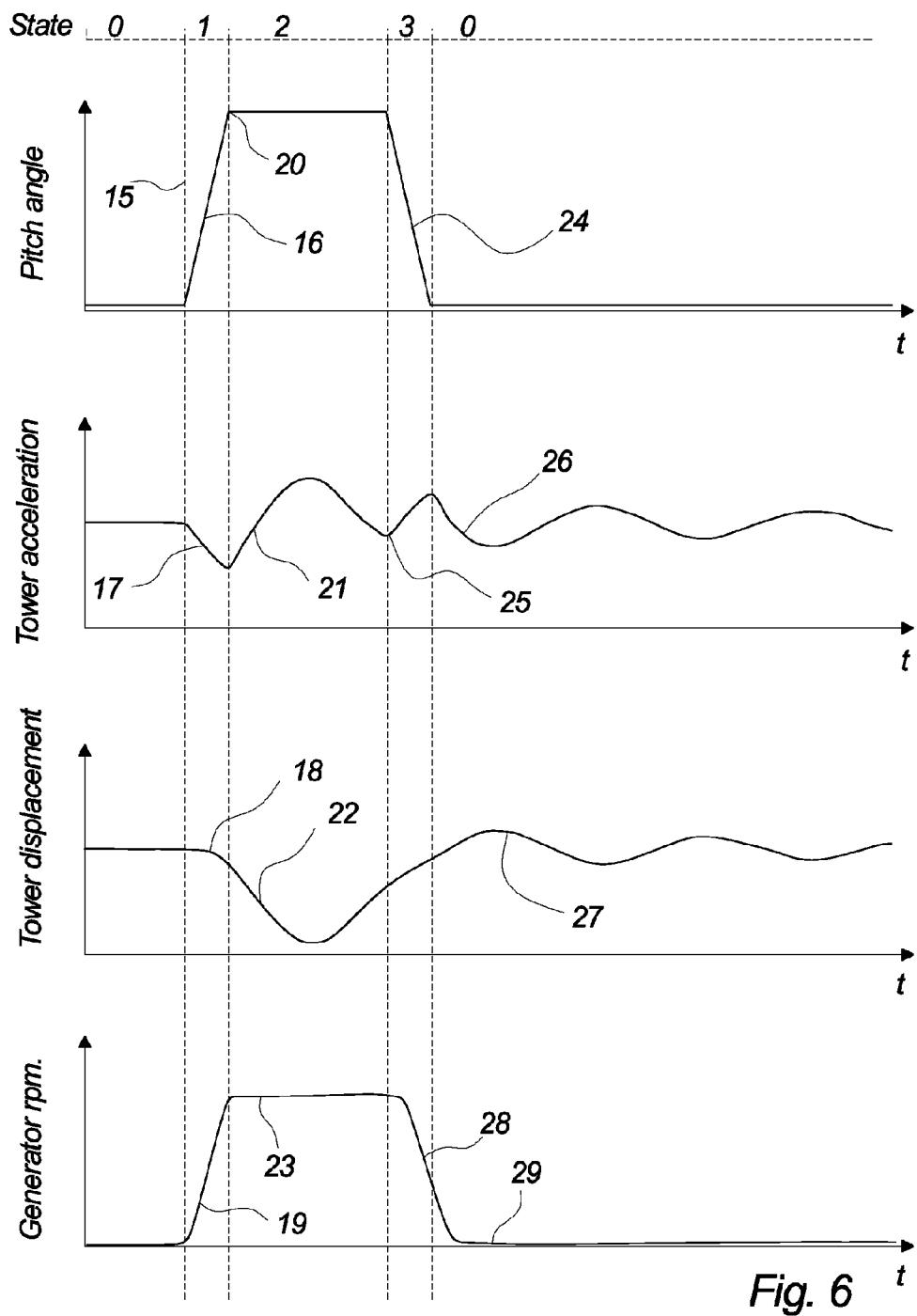
FIG. 6 illustrates a timing diagram for one preferred embodiment of the invention.

FIG. 6 illustrates schematically one embodiment of the invention, where sensor means for measuring tower acceleration is present, a simplified timing diagram showing the relation between control states, pitch angle, tower acceleration, tower displacement and generator rpm during a grid fault.

State 0:

The pitch angle, tower acceleration, tower displacement and generator rpm. are ideal constant during normal operation.

State 1:

When a utility grid fault is detected 15 the wind turbine rotor blade or blades are pitched towards NOPA 16. The hereby sudden change in aerodynamical thrust is reflected by a tower acceleration and displacement 17, 18. Furthermore the generator rpm is increased due to an excessive amount of aerodynamical power 19.

State 2:

When said pitch angle reaches NOPA 20, yet another opposite directed change in thrust occurs and the tower will start oscillating at its eigen frequency 21, 22. The generator rpm is here stabilized at an over speed level 23 as there now is a balance between incoming aerodynamic power and generated power.

State 3:

The rotor blade or blades are pitched back to operational settings 24 when a grid recovery has been detected and for this embodiment state 3 is entered when said tower acceleration goes negative 25 i.e. reapplying of aerodynamical thrust is in counter phase to the tower acceleration. The result is damped tower acceleration 26 when returning to normal operating mode (state 0), producing only a damped tower displacement 27 whereby loads on the tower has been reduced. Furthermore the generator rpm is decreased 28 ideal to the level as before entering said grid fault mode 29.

Figure 7:
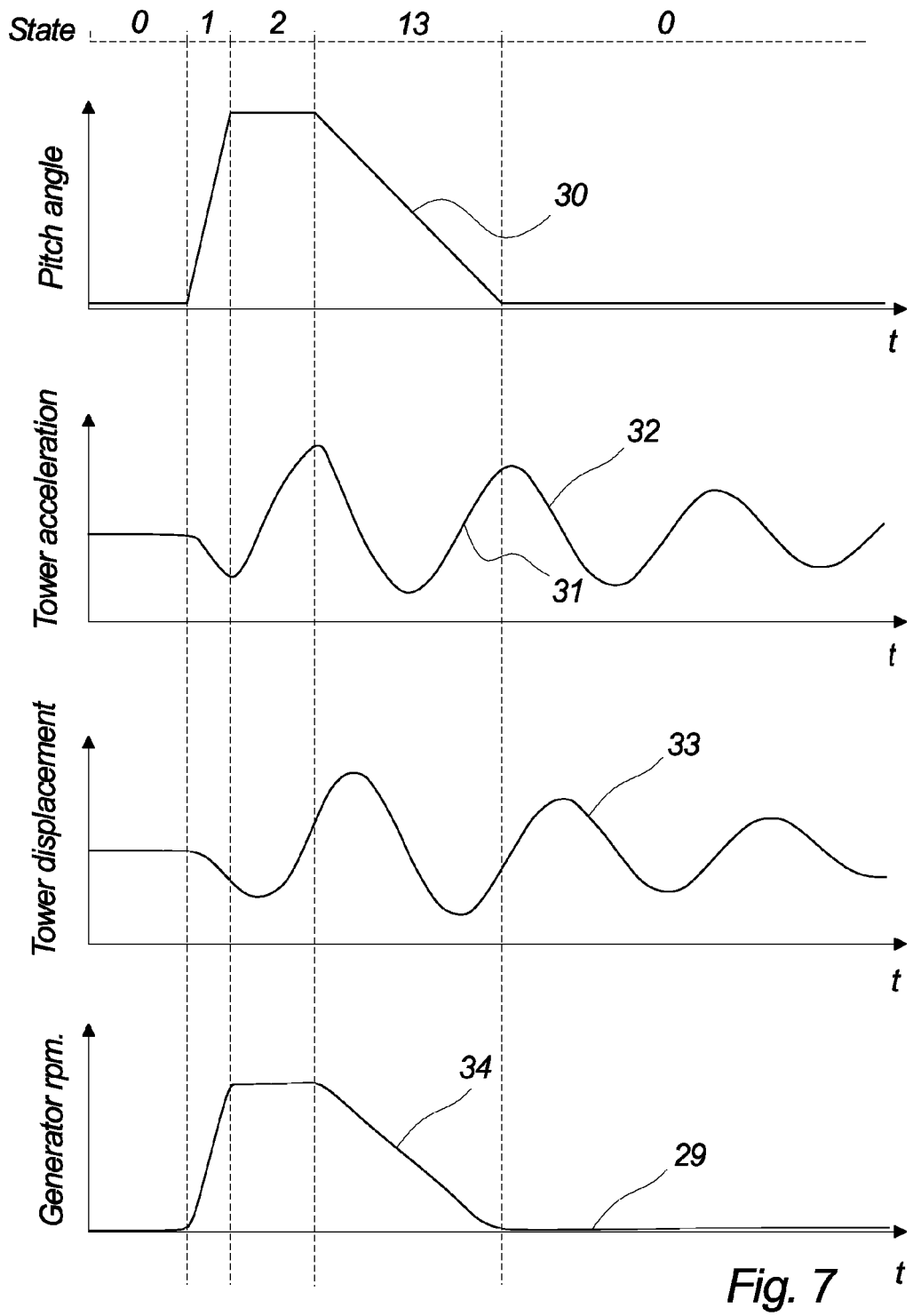
FIG. 7 illustrates a timing diagram for another preferred embodiment of the invention.

FIG. 7 illustrates schematically one embodiment of the invention, where sensor means for measuring mechanical oscillations and/or loads are not present, a simplified timing diagram showing the relation between control states, pitch angle, tower acceleration and generator rpm. during a grid fault.

The description for states 0, 1 and 2 are same for this embodiment as described for FIG. 6 and will not be repeated here.

State 13:

The rotor blade or blades are pitched back to operational settings 30 with predefined control parameters e.g. Trampback. For this embodiment state 13 is entered immediately after grid recovery has been detected. The pitch rate is chosen to be of a value that does not result in significant further excessive mechanical oscillations e.g. tower acceleration 31, 32.

The result is a tower acceleration 31, 32 when returning to normal operating mode (state 0), producing a tower displacement 33 whereby loads on the tower are kept within allowable limits. Furthermore the generator rpm is decreased 34 ideal to the level as before entering said grid fault mode 29.

The invention described has been exemplified above with reference to specific examples of control algorithms for a wind turbine during LVRT. However, it should be understood that the invention is not limited to the particular examples but may be designed and altered in a multitude of varieties within the scope of the invention as specified in the claims e.g. with use of other algorithm states or measured/detected/established/estimated values.

What is claimed is:

1. A method for controlling a wind turbine connected to a utility grid, the method comprising:
    operating the wind turbine with operational settings in a first state;
    in response to a fault event in the utility grid, controlling one or more rotor blades of the wind turbine or power generated by the wind turbine to the utility grid to change the operational settings of the wind turbine from the first state to a second state that avoids overspeeding of a rotor of the wind turbine;
    in response to the operational settings reaching the second state, operating the wind turbine with the operational settings in the second state during the fault event; and
    in response to the utility grid recovering from the fault event, controlling one or more rotor blades of the wind turbine or power generated by the wind turbine to the utility grid to change the operational settings of the wind turbine in dependency of a fixed control value as the operating settings of the wind turbine are changed from the second state.

2. The method of claim 1 wherein controlling the one or more rotor blades of the wind turbine or the power generated by the wind turbine to the utility grid to change the operational settings of the wind turbine in dependency of a fixed control value as the operating settings of the wind turbine are changed from the second state comprises:
    reapplying thrust with a constant pitch rate.

3. The method of claim 1 wherein controlling the one or more rotor blades of the wind turbine or the power generated by the wind turbine to the utility grid to change the operational settings of the wind turbine in dependency of a fixed control value as the operating settings of the wind turbine are changed from the second state comprises:
    reapplying thrust in dependency of oscillation of a tower of the wind turbine.

4. The method of claim 1 wherein the fault event is indicated by detection of a grid voltage or the voltage/second slope of an alternating utility grid voltage.

5. The method of claim 1 wherein the fixed control value comprises a constant pitch rate.

6. The method of claim 5 wherein the constant pitch rate is less than 10 degree/sec.

7. The method of claim 5 where the constant pitch rate is less than 8 degrees/sec.

8. The method of claim 1 wherein the fixed control value comprises a predefined time period.

9. The method of claim 8 wherein the predefined time period is more than 0.5 seconds.

10. The method of claim 8 wherein the predefined time period is more than 4 seconds.

11. The method of claim 1 wherein controlling the one or more rotor blades of the wind turbine or power generated by the wind turbine to the utility grid to change the operational settings of the wind turbine in dependency of a fixed control value as the operating settings of the wind turbine are changed from the second state comprises:
    reapplying thrust over a predefined time period.

12. A wind turbine connected to a utility grid, the wind turbine comprising:
    at least one blade pitch system to control the pitch of the one or more rotor blades; and
    at least one wind turbine control system including a system performing a method according to claim 1 in returning to the operational settings of the wind turbine to the first state.

13. The wind turbine of claim 12, further comprising:
    at least one detector for detecting the fault event in the utility grid.

14. The wind turbine of claim 13 wherein the at least one detector comprises at least one voltage detector.

15. A wind park comprising
    at least two wind turbines according to claim 12; and
    at least one detector for detecting the fault event in the utility grid.

16. The wind turbine of claim 1 wherein the wind turbine includes a generator, and the operational settings of the second state cause one or more rotor blades of the wind turbine to be pitched to a pitch angle that gives no or substantially no acceleration to the generator.

* * * * *